Dec. 10, 1963    J. H. SELBY    3,113,350
MEMORY WHEEL CONTROL SYSTEM FOR GILL BOX
Filed May 18, 1960    4 Sheets-Sheet 2
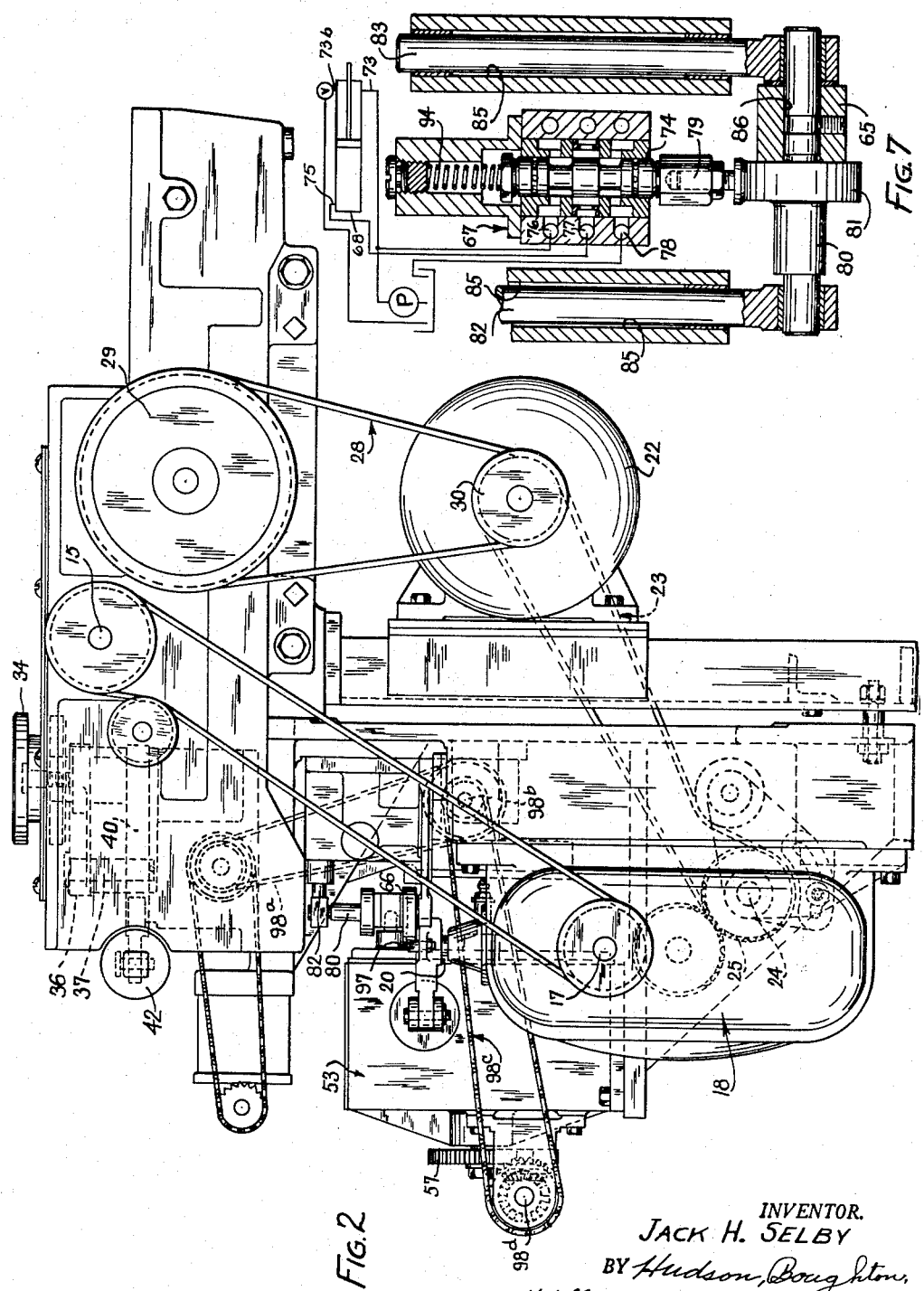
INVENTOR.
JACK H. SELBY
BY Hudson, Boughton,
Williams, David & Hoffmann
ATTORNEYS Dec. 10, 1963  J. H. SELBY  3,113,350
MEMORY WHEEL CONTROL SYSTEM FOR GILL BOX
Filed May 18, 1960  4 Sheets-Sheet 3

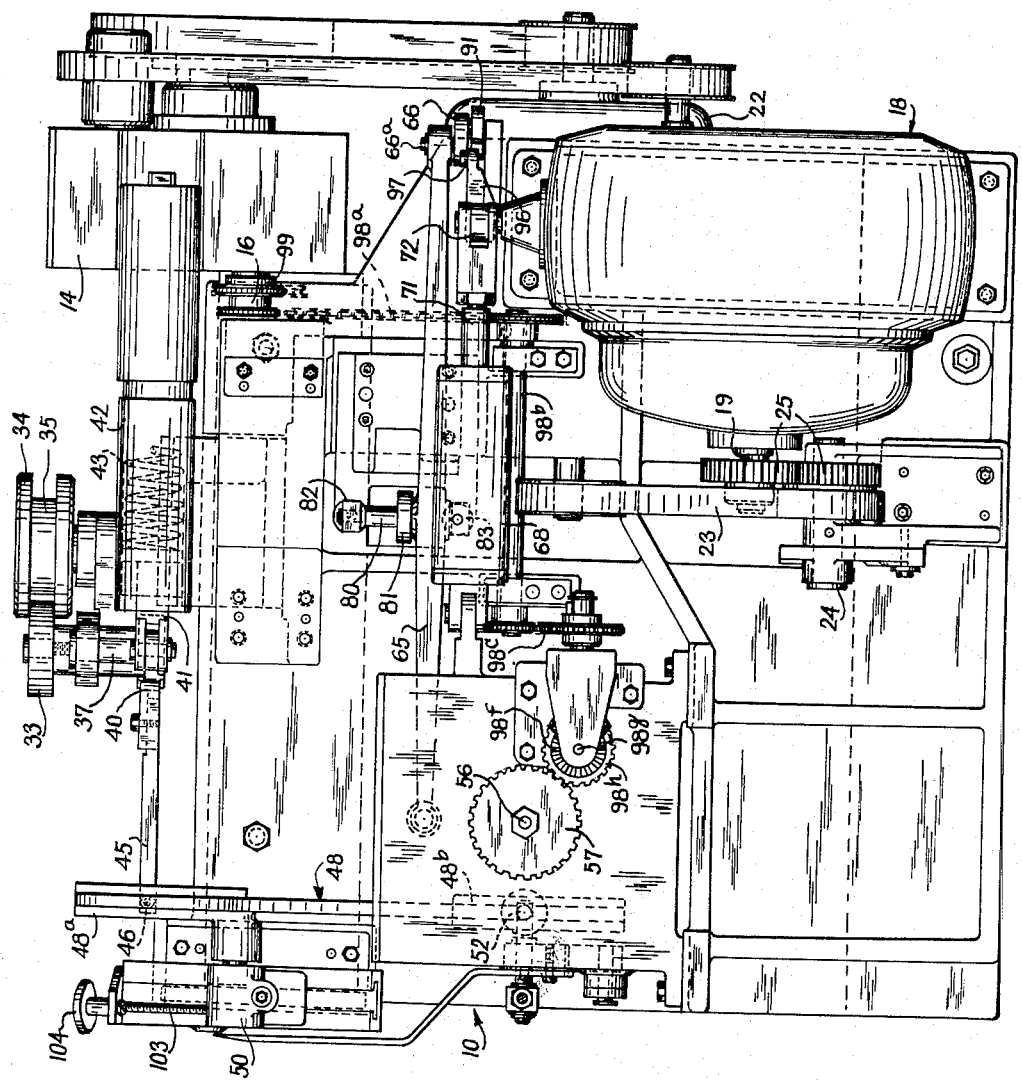

INVENTOR.
JACK H. SELBY
BY Hudson, Boughton,
Williams, David & Hoffmann
ATTORNEYS Dec. 10, 1963  J. H. SELBY  3,113,350
MEMORY WHEEL CONTROL SYSTEM FOR GILL BOX
Filed May 18, 1960  4 Sheets-Sheet 4

INVENTOR.
JACK H. SELBY
BY Hudson, Boughton,
Williams, David & Hoffmann
ATTORNEYS

United States Patent Office 3,113,350
Patented Dec. 10, 1963

3,113,350
MEMORY WHEEL CONTROL SYSTEM
FOR GILL BOX
Jack H. Selby, Chagrin Falls, Ohio, assignor to The Warner & Swasey Company, Cleveland, Ohio, a corporation of Ohio
Filed May 18, 1960, Ser. No. 29,969
17 Claims. (Cl. 19—240)

The present invention relates to an apparatus wherein the speed or position of an element is controlled by a mechanical memory wheel and, particularly, to an intersecting frame gill box wherein the speed of the faller bar section is varied by a memory wheel in accordance with the thickness of the sliver entering the gill box to control the draft of the sliver.

Memory wheels comprising a plurality of axially slidable memory pins arranged in a circular array have been utilized in the controls for various types of apparatuses wherein an operation is to be controlled in accordance with a condition which varies but with a delay between the time of sensing and the time of control. Memory wheels are commonly used in apparatus, such as gill boxes, for treating or operating upon a strip of material, such as a sliver, which passes through the apparatus, with a particular condition of the strip being sensed before the strip enters the apparatus to signal a future change in a variable element of the apparatus, such as the speed of the faller bar section of a gill box, when the sensed portion reaches the proper part of the apparatus. In a gill box, the thickness of an entering sliver is sensed and the speed of a variable speed element which controls the drafting of the sliver as it passes through the gill box is varied in accordance with the thickness of the entering sliver to assure the obtaining of a uniform product. A memory wheel is used in the control system and is set by the thickness detector which measures the thickness of the sliver before it enters the gill box and is read out after a predetermined delay at a time when the sliver which has been measured reaches the faller bar section of the gill box so that the control appropriate for that portion of the sliver will be effected at the proper time.

One problem involved with systems using memory wheels is that the axially slidable pins are only capable of exerting a relatively small force at the read-out station. Since the read-out member is urged into engagement with the end of the pin at the read-out station, it will exert a force tending to slide the pin axially; and, if the force required to displace the read-out member is too large, the pin will shift and the setting of the pin will be destroyed. Various devices have been devised to lock the pins in position as they are moved to the read-out station, but the locking devices are primarily frictional locking devices and will allow the pin to slip if sufficient force is applied thereto. Furthermore, the pins only effect relatively small displacements so that the read-out must be sensitive to slight variations and the displacement of the read-out member must generally be amplified in order to effect control of the gill box.

An important object of the present invention is to provide a new and improved apparatus having a control system including a memory wheel comprised of a plurality of axially settable pins which are read by mechanism displaced in accordance with the axial setting of the latter, the read-out mechanism for the memory wheel being so constructed and arranged that a smaller force than heretofore necessary is required to displace the read-out member and so that the displacement of the read-out member is amplified by the read-out mechanism to provide a sufficiently large displacement at the output of the read-out mechanism for effecting the necessary control, the output of the read-out mechanism preferably being capable of a high power output.

Another object of the present invention is to provide a new and improved apparatus having a control system utilizing a memory wheel comprised of a plurality of axially slidable pins, and a read-out means for the memory wheel which has improved sensitivity and response to slight displacements in the setting of the pins, and which is such that substantial power is available at the output of the read-out mechanism.

It is a further object of the present invention to provide a new and improved apparatus wherein a memory wheel controls the setting of a variable speed means or the setting of a movable device in accordance with the settings of the pins of the memory wheel, and wherein the pins apply a force having an axial component to shift a read-out member, with the force acting on the read-out member being amplified and used to actuate a control member for controlling the energization of a power actuator which, in turn, operates to return the control member toward a neutral position wherein the actuator is stopped or de-energized.

Another object of the present invention is to provide a new and improved gill box in which the speed of a variable speed draft control element is varied in accordance with the thickness of the sliver, and in which the mechanism for varying the speed of the draft control element is capable of extremely fine adjustment and responds to slight variations in the thickness of the sliver.

It is also an object of the present invention to provide a new and improved gill box having a detector for detecting the thickness of the sliver entering the gill box and setting a memory wheel in accordance with the detected thickness, and in which a simplified mechanism is provided for effecting an adjustment of the memory wheel to effect a predetermined speed of the faller bar setting for different thickness slivers.

Further objects and advantages of the present invention will be apparent from the following detailed description of the preferred embodiment thereof made with reference to the accompanying drawings forming a part of the present specification and in which:

FIG. 1 is an elevational view of the back of a gill box of the intersecting-frame type embodying the present invention;

FIG. 2 is a side elevational view of the gill box of FIG. 1, looking at the right-hand side of the gill box as it is viewed in FIG. 1;

FIG. 7 is a sectional view taken approximately along line 7—7 of FIG. 5.

The present invention is susceptible of various constructions and modifications and of use with various types of apparatuses, but is particularly useful when embodied in a system for controlling the draft of a sliver being operated upon by a gill box in accordance with the thickness of the sliver entering the gill box, and is herein shown as embodied in such a system.

Figure 6:
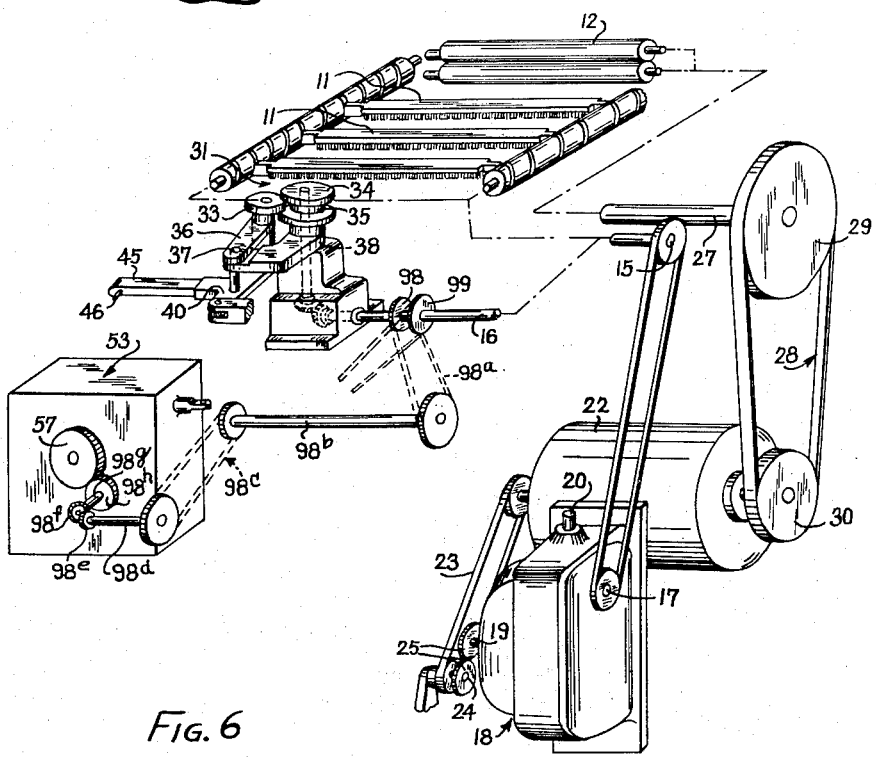
FIG. 6 is a diagrammatic view of the parts of the gill box of FIG. 1, showing the parts somewhat in perspective.

Referring to the drawings, the gill box shown therein is designated generally by the reference numeral 10. Gill boxes are well known in the art and the gill box is not, therefore, shown in detail and will not be described in detail. Suffice it to say that gill boxes generally comprise a faller bar section, including a plurality of faller bars 11, shown diagrammatically in FIG. 6, which are moved through the sliver to straighten the fibers thereof as the sliver is moved through the gill box, and a pair of front rolls 12 which draw the sliver from the faller bar section. The faller bars 11 are driven through their path from a gear box 14 having an input shaft 15 which is driven to effect the driving of the faller bars 11 and of a rotatable output shaft 16. The input shaft 15 is driven from the output shaft 17 of a positive, infinitely variable speed transmission 18. The positive, infinitely variable speed transmission 18 is a commercially available transmission and will not, therefore, be described in detail. Suffice it to say that the variable speed transmission includes an input shaft 19 which is driven to effect the rotation of the output shaft 17, and the ratio of the speed of the output shaft to the speed of the input shaft is controlled by the setting of a control shaft 20, which is rotatable in one direction to increase the speed of the output shaft 17 and in the opposite direction to decrease the speed of the output shaft.

The variable speed transmission 18 is driven from a motor 22 through a belt drive 23 which effects the rotation of a shaft 24, which, in turn, is geared to the transmission input shaft 19 by meshed gears 25.

The motor 22, in addition to driving the variable speed transmission 18 which, in turn, drives the input shaft 15 of the gear box 14, also drives an input shaft 27 of the gear box 14 through a belt drive 28, the drive 28 including a sprocket 29 on the shaft 27 and a sprocket 30 on the shaft of the motor 22. The shaft 27 is connected to drive the front rolls 12 of the gill box.

The thickness of the sliver entering the gill box is detected by a thickness detector 31 which includes a pair of rolls 33, 34, between which the sliver passes as it enters the gill box, the rolls 33, 34, in the illustrated embodiment, being rotatable about vertical axes. The roll 34 is driven from the shaft 16 and has an annular groove 35 in the periphery thereof which is adapted to receive the sliver, and the roll 33 is receivable in the annular groove 35. The roll 33 may be termed a detector roll and is rotatably supported by a horizontal arm 36 fixed to a vertical shaft 37 journaled in a bracket 38 carried by the frame of the gill box. The shaft 37 extends downwardly below the bracket 38 and a lever 40 is fixed to the lower end of the shaft. The lever 40, the shaft 37, and the roll 33 are urged in a clockwise direction about the axis of the shaft 37, as the latter is viewed in FIG. 5, to urge the detector roll 33 into the annular groove 35 by a spring-biased plunger 41. The plunger 41 is slidably supported in a cylinder 42 housing a spring 43 which acts on the plunger 41 and the plunger is pivotally connected to the lever 40 on the side of the axis of the shaft 37 opposite to the detector roll 33.

The detector roll 33 and, in turn, the lever 40 will be oscillated as the thickness of the sliver passing between the detector roll 33 and the roll 34 varies. The control shaft 20 is positioned, as described hereinafter, in accordance with the position of the detector roll 33 and, therefore, the oscillations of the detector roll 33, and, in turn, the oscillations of the lever 40 control the speed of the output shaft 17 of the variable speed transmission 18 to control the speed of the faller bars 11 and the output shaft 16.

The oscillation of the lever 40 is amplified by a beam 45 which extends horizontally outwardly from the lever 40 and generally perpendicular thereto. The beam 45 is disposed on the same side of the shaft 37 as the detector roll 33 and has a finger 46 secured to its outer, free end. The finger 46 engages a lever 48 which is pivoted intermediate its ends to a slide 50. The pivot connection of the lever 48 is designated by the reference numeral 51 and, in the illustrated embodiment, the lever 48 is a vertically extending lever, and the pivot connection 51 supports the lever for rocking movement about a generally horizontal axis. The beam 45 is disposed above the axis of the pivotal connection and the finger 46 engages a generally vertically extending surface 48a on one side of the upper end of the lever, and when the beam 45 is moved counterclockwise, as the beam is viewed in FIG. 5, the lever 48 is rocked clockwise about its axis, and conversely.

The lower end 48b of the pivoted lever 48 engages an input member 52 for a memory wheel device 53, which member is biased by a spring 49 to engage the lever 48. The lever 48 is biased in a counterclockwise direction about its pivot as described hereinafter, to bias the lower end thereof into engagement with the input member 52 and the upper end into engagement with the finger 46. The memory wheel device 53 comprises a wheel 54 rotatably supported within a housing 55 by a shaft 56 having a gear 57 fixed thereto for driving the shaft to rotate the wheel 54 in timed relation to the speed of the sliver. The wheel 54 carries a plurality of axially slidable memory pins 58 arranged in a circular array about the axis of the wheel, and the input member 52 operates to displace the pins 58 as they rotate past the input or read-in station of the wheel to set the pins in accordance with the position of the input member 52, and, in turn, in accordance with the angular position of the lever 48.

The memory wheel will not be described in detail, since memory wheel devices are well known in the art and their construction and operation are familiar to those skilled in the art. After the pins 58 are set at the read-in or input station, the rotation of the wheel 54 carries them past a read-out station 61 where the pins operate to set a read-out member 62 in accordance with the setting of the pins. The read-out member 62 operates to control the displacement of a beam 65 which extends, in the illustrated embodiment, horizontally from the read-out member 62 and is pivoted at its end remote from the read-out member to a cam member which, in the illustrated embodiment, is a circular disk 66 by a pivot connection 66a.

The beam 65 is connected to operate a control valve 67 for a fluid pressure actuator 68. The fluid pressure actuator 68 is double-acting and comprises a cylinder 69 having a movable piston 70 therein connected by a rod or output member 71 to a crank arm 72 fixed to the rotatable shaft 20 of the variable speed transmission 18. The valve 67 is, in the illustrated embodiment, a spool valve having a movable valve spool 74 slidable axially in the housing of the valve to control the connection to the actuator 68 to drain and a source of fluid pressure.

Preferably, the actuator 68 is of the type where the rod side of the piston has a smaller effective piston area than the other side so that, if equal pressures were present on both sides of the piston, the piston would move in the direction of the rod side of the piston. The small area side of the piston, i.e., the rod end of the cylinder, is continuously supplied with pressure from a pump P through a connection 73 to maintain full pressure on the rod end of the cylinder. Preferably, the small area side of the piston is continuously connected to drain through a restricted port or a valve V and a connection 73b which maintains the pressure on the piston but provides a continuous fluid flow. The valve 67 includes a pressure port 76 and the valve spool 74 has a neutral position wherein a port 77 connected to the cylinder on the large area side of the piston is effectively blocked. If the valve spool 74 is shifted in one direction from the neutral position, it connects the port 77 to a drain port 78 and if in the other direction, it connects the port 77 to the pressure port 76 through a connection 75. If the large area side of the piston is connected to drain, the piston, of course, moves in the direction of the large side of the piston; and if the large side of the piston is connected to the source of fluid pressure, the piston will move in a direction away from the large side of the piston. Preferably, the lands between the cylinder port 77 and the drain and pressure ports 78, 76 are underlapped to provide a leakage flow when the valve is in neutral position. This improves the response of the valve.

The valve spool 74 has a stem 79 which extends outwardly of the valve casing and is connected to a pin 80 which is, in the illustrated embodiment, a vertically disposed pin that extends perpendicular to the axis of the valve spool. The valve spool bears on a radial flange 81 on the pin 80 which is disposed intermediate the ends of the pin 80. The pin 80 has its upper and lower ends journaled in respective upper and lower rods 82, 83, see FIGS. 1, 2 and 7, which are supported for movement parallel to the axis of the valve spool by guide bores 85 in a bracket fixed to the frame of the gill box.

The lower rod 83 is disposed below the beam 65, while the upper rod 82 is disposed above the beam 65, and the pin 80 is received in an opening 86 in the beam. The beam 65 is disposed between the flange 81 and the rod 83.

It can be seen that the rods 82, 83 and the bores 85 constrain the pivotal connection between the beam 65 and the pin 80, i.e., the axis of opening 86, to move linearly along the extended axis of the valve spool. The circular disk 66, to which the beam 65 is pivoted, is supported for movement to permit the pin 80 to move linearly upon displacement of the free end of the beam 65 by the read-out member 62. To this end, the circular disk 66 is pivoted by a pivotal connection 90 to one end of a horizontal arm 91, having its other end pivoted to the frame of the apparatus by a pivotal connection 92. The arm 91 extends generally transversely of the beam 65 and the pivotal connection 90 is offset from the pivotal connection of the beam 65 to the circular member 66. As the free end of the beam 65 is displaced, the arm 91 may swing about its pivot 92 to allow the pin 80 to move linearly along the extended axis of the valve spool and parallel to the axes of the guide rods 82, 83.

Figure 4:
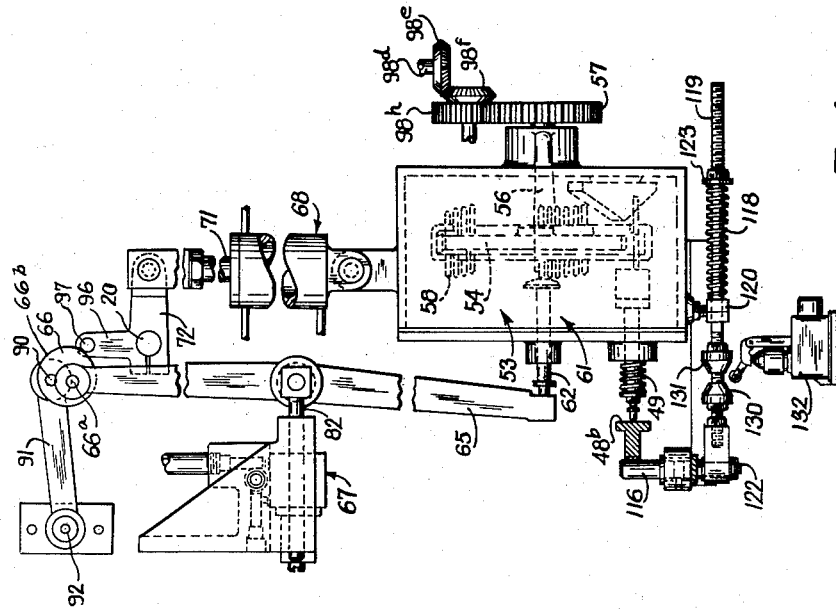
FIG. 4 is a fragmentary sectional view, looking approximately from line 4—4 of FIG. 3 in the direction of the arrows.

The control valve 67 includes a spring 94 which acts upon the valve spool and urges the latter outwardly to, in turn, urge the beam 65 in a counterclockwise direction, as the latter is viewed in FIG. 4, about its pivot to the member 66 to urge the read-out member 62 into engagement with the end of the pin in read-out position.

It can now be seen that the pins of the memory wheel through the read-out member 62 will effect the positioning of the free end of the beam 65 in accordance with the setting of the pins as the pins move past the read-out member 62. The read-out member 62 or the part of the lever 65 engaged thereby may be considered the command part of a power servo having the piston rod 71 as the slave member whose movements follow the movements of the command member, but in an amplified manner. Displacements of the free end of the beam 65 will be translated into linear movements of the valve spool to effect a control of the actuator 68 in accordance with the setting of the memory pins. The valve spool has a neutral position wherein the axis of pin 80 is disposed at a predetermined point in space and, if the free end of the beam 65 is then displaced, the pin 80 is moved from this point to shift the valve from its neutral position to energize the actuator with pressure fluid in accordance with the magnitude of the valve displacement to effect operation of the actuator 68. As the piston of the actuator 68 moves in response to the shifting of the valve spool, a feedback or follow-up mechanism is provided to return the pin 80 toward its neutral position to indicate that the actuator 68 has operated in response to the displacement. To this end, the crank 72 is provided with an arm 96 which extends in a radial direction from the control shaft 20 and generally perpendicular to the crank 72 and carries a roller 97 at its outer end which rides on the circular disk 66. As the crank 72 is turned upon the operation of the actuator 68, the roller 97 either will move the circular disk 66 if the crank arm is rotated counterclockwise, as viewed in FIG. 4, or the circular disk 66 will follow the roller 97 if the crank arm is moved in a clockwise direction, as viewed in FIG. 4, by reason of the bias of spring 94. This shifts the control valve toward its neutral position and when it is returned thereto the actuator 68 will be de-energized.

It will be appreciated that the bias of spring 94 acting through the valve spool 74, the stem 79, and the beam 65 will tend to rotate the circular disk 66 about the pivotal connection 90, but that this will be prevented by a roller 97. It will be further appreciated that when the free end of the lever 65 is displaced and the arm 91 swings to allow the pin 80 to move linearly, the arcuate surface 66b upon which the roller 97 rides is actually a cam surface curved in a direction to cause the circular disk 66 to shift laterally so as to amplify the displacement of the pin 80 over that which would be produced if the pivotal connection 66a for the beam 65 were a fixed pivot. The position of the roller 97 with respect to the curvature of the disk is chosen so that when the pins of the memory wheel are in their datum position at the read-out station, any deflection of the beam 65 outwardly away from the pins will cause the cam member or disk 66 to shift to the left, as viewed in FIG. 4, to provide the amplifying motion as the pivotal connection 66a moves lengthwise of the beam 65 to allow the pin 80 to move linearly, as it is constrained to do by the guide rods 82, 83, as viewed in FIG. 4.

From the foregoing description, it can be seen that the detector roll 33 assumes a position which is dependent upon the thickness of the sliver passing between the rolls 33, 34, and this position, in turn, determines the position of the beam 45 which controls the angular position of the pivoted lever 48. The position of the pivoted lever 48 determines the setting of the input member 52 of the memory device 53 to set the pins of the memory wheel as the pins are rotated by the read-in station. The setting of the pins in accordance with the thickness of the sliver is substantially instantaneous and the setting is read out from the wheel after a sufficient delay so that the thickness setting of the pin is read at the same time that the part of the sliver corresponding to the thickness setting reaches the faller bar section. When the pin reaches the read-out station, it sets the read-out member 62 to a position corresponding to the previously measured thickness of the sliver and the position of the member 62 operates through the beam 65 to control the setting of the variable speed transmission 18. When the beam 65 is displaced, the control valve 67 is actuated to operate the actuator 68 in the direction necessary to compensate for the change in thickness of the sliver. If the thickness of the sliver increases, the read-out member 62 will be displaced axially outwardly of the memory wheel device to deflect the beam 65 in a clockwise direction about its pivot, to shift the valve spool of control valve 67 inwardly to connect the large or head end of the actuator 68 to drain, to cause the piston rod 71 to move inwardly of the cylinder of the actuator and to rotate the crank arm 72 clockwise, as viewed in FIG. 4, to decrease the speed of the output of the variable speed transmission 18. The clockwise rotation of the crank arm 72 and the control member 20 moves the roller 97 in a direction away from the circular member 66, and the bias applied to the beam 65 by spring 94 causes the circular member 66 to follow the roller 97 and effects the return of the pin 80 and the valve spool of the valve 67 to their neutral position. If the thickness of the sliver decreases, the detector roll 33 will move inwardly of the channel in the detector roll 34 to effect the operation of the actuator 68 in the opposite direction to increase the speed of the faller bar section.

As pointed out above, the memory wheel 54 is rotated at a rate such that the set pin or pins representing the measured thickness of a part of the sliver arrive at the read-out station at the time that the speed of the faller section is to be varied to control the draft of the measured sliver. To this end, the gear 57 is driven from the output shaft 16 of the gear box 14 so that the speed of the wheel will vary with the speed of the faller bars. A pulley 98 is fixed to the shaft 16 and is connected by a belt 98a to drive a shaft 98b which is connected by a belt drive 98c to drive a shaft 98d. The shaft 98d has a bevel gear 98e thereon meshing with a cooperating gear 98f fixed to a rotatable shaft 98g, the shaft 98g having a gear 98h thereon which meshes with the gear 57 to drive the wheel 54.

The shaft 16 also has a pulley 99 connected by a belt drive to rotate a creel (not shown) for supplying sliver to the gill box. It will be seen that the speed of the creel will also be varied with the thickness of the sliver. Since the rate at which the creel is being rotated and the speed of the faller bars will vary with sliver thickness and since the speed of the rolls 12 remain constant, the draft of the sliver will vary in accordance with sliver thickness, as will be appreciated by those skilled in the art.

In a memory wheel device of the type shown, the pins are set in a datum position after they pass the read-out station and before they return to the read-in station of the memory device. The pins are displaced inwardly from this datum position by the input member 52. This means that the input member 52, whose position is determined by the thickness of the sliver, must always be disposed in a particular position to effect a given displacement of the pin and, in turn, a given speed. It is desirable to be able to adjust the position of the input member 52 for a given position of the finger 46. To this end, the slide 50 is supported for adjusting movement along a generally vertical but inclined surface 100 of a block 101 fixed to the frame of the apparatus. A lead screw 103 threads into the slide 50 and extends generally upwardly from the slide 50 and has a handwheel 104 fixed to the upper end thereof. The upper end of the lead screw 103 inwardly of the handwheel 104 is journalled in a support plate 105 fixed to the block 101. Rotation of the handle 104 will move the slide 50 to translate the axis of the pivot connection parallel to itself along a line having components both transverse to and parallel of the line of movement of the input member 52, i.e., both horizontal and vertical components in the illustrated embodiment, to shift the pivot 51 of the lever 48. If the slide 50 is moved downwardly, the speed of the variable transmission is increased for a given thickness of sliver; and if the slide 50 is moved upwardly, the speed of the transmission is decreased for a given thickness of the sliver.

Preferably, an indicator mechanism is provided to indicate when the setting of the lever 48 will provide a predetermined output speed at the output shaft of the variable speed transmission 18. This predetermined speed shall be designated as the normal speed setting of the apparatus. To this end, an indicator 108 is pivoted adjacent the lower end of the pivoted lever 48 to a generally horizontal support 110. The pivotal connection connecting the indicator 108 to the support 110 is indicated by the reference numeral 111, and the indicator extends upwardly from the pivotal connection 111 along the lower end 48b of the pivoted lever 48. In the preferred and illustrated embodiment, the indicator extends upwardly to a point adjacent the pivotal connection 51 for the lever 48 and terminates in a pointer 113 which operates over indicia on a scale plate 114.

The indicator 108 follows the movement of the lower end of the pivoted lever 48 and has a roller 116 which extends from the indicator 108 to engage the lever 48 on the side thereof opposite to the surface engaged by the input member 52. The indicator 108 is biased clockwise about its pivot, as viewed in FIG. 3, to urge the roller 116 toward engagement with the lever 48 by a spring 118 disposed about a rod 119 slidably supported in a block 120 carried by the casing of memory wheel device 53. The rod 119 is tied to the indicator 108 by a pivot connection 122 and the spring 118 abuts the block 120 and a washer 123 on the rod 119 to urge the rod 119 axially in a direction to move the roller 116 into engagement with the pivoted lever 48 at a point opposite the point of engagement of the input member 52. The spring 118 also operates to urge the lever 48 in a counterclockwise direction about its pivot to urge the upper end of the lever into engagement with the finger 46.

If the output speed of the variable speed transmission is to be set at the predetermined speed corresponding to the normal speed setting of the input member for a given position of finger 46 which would correspond to a given sliver thickness, the handwheel 104 is operated to adjust the pivotal connection 51 to cause the pointer 113 to return to the zero setting on the scale plate 114. Whenever the pointer 113 is at the zero setting, the lower end of the lever 48, engaged by the input member 52, is in a predetermined position corresponding to the normal speed setting of the input mechanism.

Figure 3:
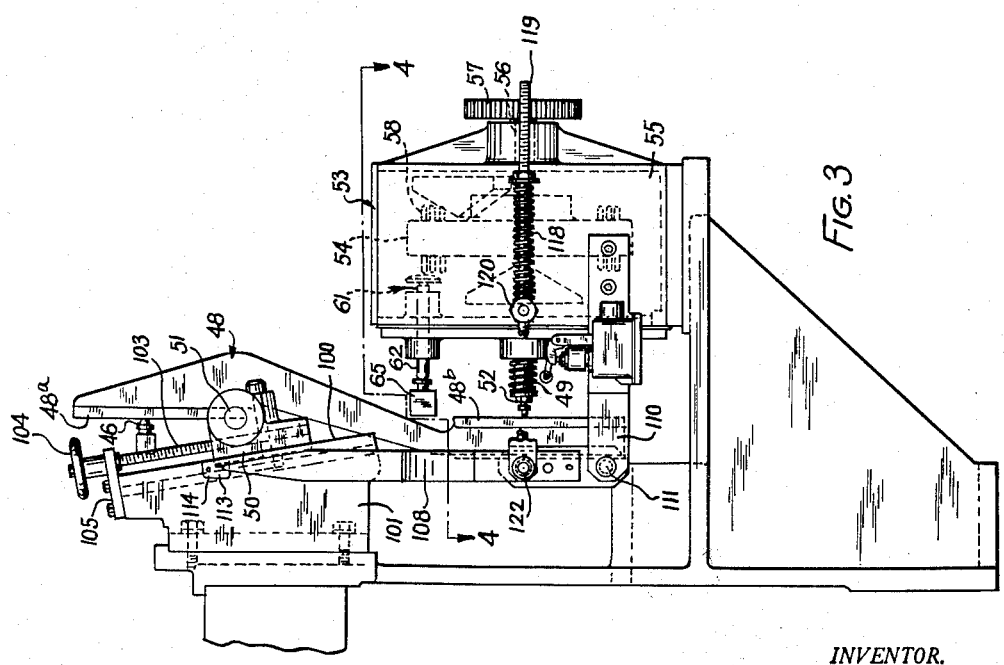
FIG. 3 is a fragmentary elevational view, looking at part of the left-hand side of the gill box as viewed in FIG. 1.
Figure 5:
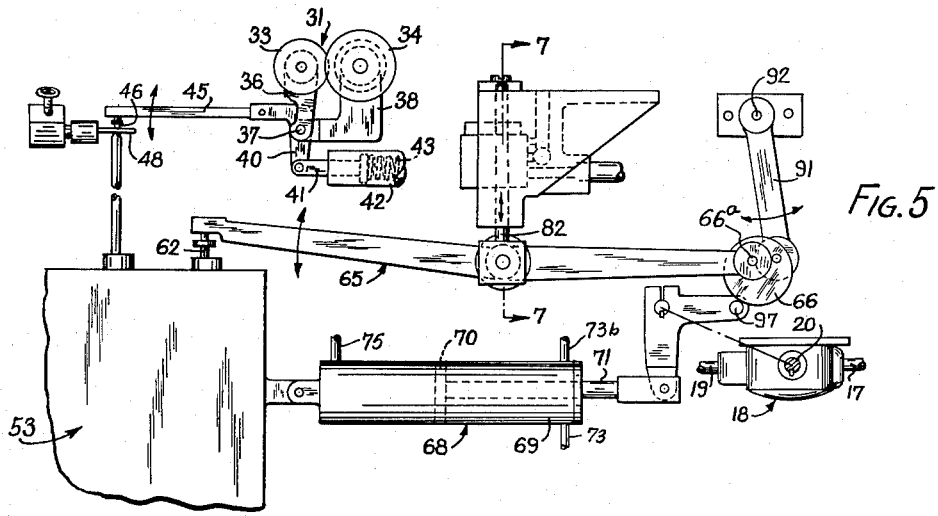
FIG. 5 is a diagrammatic view of parts of the apparatus, with the parts being viewed in elevation.

It will be noted that if the sliver thickness decreases and the detector roll 33 moves clockwise about its pivot, as viewed in FIG. 5, the finger 46 will also be swung clockwise about its pivot and, as viewed in FIG. 3, the finger 46 will move to the left. This means that, if the lever 48 is to be set to provide the normal speed with the pointer 113 at zero for a sliver which is thinner than the thickness corresponding to the setting shown in FIG. 3, the finger 46 will be displaced to the left of its position, shown in FIG. 3, and the handwheel 104 will have to be rotated to move the pivot 51 upwardly to bring the detector 108 to zero for the corresponding position of the finger 46. The upward movement of the pivot 51 has both a vertical and horizontal component and the length of the lever arm between the finger 46 and the pivot 51 is shortened, while the length of the lever arm between the pivot and the input member 52 is lengthened. This means that for a given movement of the finger 46 from its position where the pointer 113 is at zero, the corresponding displacement of the input member 52 will be greater than it is for a thicker sliver. This is appropriate since a given deflection of the finger 46 will be proportionately greater for a thin sliver than it is for a thick sliver, and a proportionately larger speed change should be effected. The angle of the slide 50 is chosen to provide the proper compensation in the length of the arms through which the finger 46 and the input member 52 operate to set the input for the various thickness slivers for which the apparatus is set.

It can now be seen that the present invention provides a new and improved apparatus for controlling the drafting of a sliver by a gill box in accordance with the thickness thereof. The mechanism for detecting the thickness of the sliver and setting a memory wheel in accordance therewith is particularly sensitive and capable of being readily adjusted to change the speed setting of the apparatus for a given sliver thickness. In addition, new and improved mechanism is provided for sensing the position of the pins of the memory wheel as they are rotated past a read-out station, and for effecting a larger displacement of a control member or a member to be controlled in accordance with the setting of the pins without requiring substantial force to be applied by the pins of the memory wheel. The force with which the pins actuate the read-out member 62, which may be considered the command member or part of a power servo comprising the control valve 67 and actuator 68, is amplified through a mechanical power amplifier comprising the beam 65, and is utilized to shift the valve spool 74, or control element, of the control valve 67 to control the energization of the power actuator 68 whose operation effects the necessary adjustment. The piston rod 71 may be considered as the slave member of the power servo comprising valve 67 and actuator 68. Feedback means comprising the arm 96 and roller 97 is operated by the actuator to shift the beam 65 to return the control valve 67 toward a neutral position to effect a de-energization of the actuator when the actuator has assumed a position corresponding to the setting of the memory pins. Accordingly it can be seen that the control valve 67 is positioned in accordance with the error in the relative positions of the read-out member 62 and of the piston rod 71 of the actuator. The feedback can readily be varied to control the extent of operation or displacement of the power actuator required to return the valve spool 74 to neutral for a given displacement thereof. This enables a slight displacement of beam 65 to be translated into a relatively large displacement of the piston rod 71 and it is apparent that the output of the read-out mechanism at rod 70 is a high power output.

If the sliver breaks or if the thickness increases beyond a predetermined point, it is desirable to shut down the apparatus. Accordingly, the rod 119 is provided with spaced cams 130, 131 which have surfaces that taper toward each other, and which are adapted to actuate a stop switch 132 if the rod 119 is displaced more than a predetermined distance in either direction from a predetermined position. The rod 119 will move with the detector 108 as the detector follows the movements of the pivoted lever 48.

If the sliver breaks, the detector roll 33 will move into the channel 35 and the lever 48 will swing counterclockwise about its axis to its maximum position in that direction and the rod 119 will follow and the cam 131 will actuate the switch 132 to stop the motor 22. Conversely, if the sliver is too thick, the lever 48 will swing in a clockwise direction beyond a maximum desired position and the cam 130 will actuate the switch 132 to stop the motor 22.

From the foregoing, it can be seen that the present invention provides a new and improved apparatus for controlling the draft of a sliver being operated upon by a gill box, the system including a memory wheel having pins set in accordance with the thickness of the sliver and a power servo actuated in accordance with the setting of the pins to vary the speed of the draft control element of the gill box.

The invention further provides a new and improved, finely adjustable input mechanism for setting the memory wheel in accordance with the thickness of the sliver and a sensitive, quick-acting read-out mechanism for sensing the position of the pins of the memory wheel and effecting a control in accordance therewith.

While the preferred embodiment of the present invention has been discussed in considerable detail, further constructions, modifications, and arrangements will be apparent to those skilled in the art, and it is hereby my intention to cover all such constructions, modifications, and arrangements as fall within the ability of those skilled in the art and the scope and spirit of the present invention.

Having described my invention, what I claim is:

1. In a gill box having a driven element whose speed is varied to control the draft of the sliver being operated upon, a positive infinitely variable speed transmission having an output shaft and a movable control member adjustable to control the speed of said output shaft, means connecting said output shaft to drive said element, a reversible power actuator having an output member operatively connected to move said control member upon energization and operation of the actuator, and control means responsive to the thickness variations of sliver entering said gill box for energizing said actuator to variably position said control member in accordance with the thickness variations of said sliver, said control means comprising sensing means for sensing the thickness of said sliver, a control element for said actuator displaced in response to a sensing by said sensing means of a variation in thickness of said sliver and having a neutral position, position responsive means responsive to the position of said control element and effective when the control element is disposed in a position displaced from said neutral position to energize and operate said actuator in a direction dependent upon the direction of displacement of said position of said control element from said neutral position, and follow-up means independent of said sliver interconnecting the output member of said actuator to said control element and responsive to the operation of said actuator for returning said control element independently of said sliver toward said neutral position as the actuator operates in the direction corresponding to the displacement of the position of the control element from its neutral position.

2. In a control system, a memory wheel, a movable element to be adjustably positioned in accordance with the setting of said rotatable memory wheel, said memory wheel comprising a plurality of pins arranged in a circular array, read-in and read-out stations adjacent said wheel at which said pins are respectively set and read, and a power servo for sequentially sensing the position of the pins as the pins are moved past the read-out station and for positioning said movable element in accordance therewith, said power servo comprising a command part positioned by said pins, a slave member connected to position said movable element in accordance with the position of said slave member, power means energizable to position said slave member in accordance with the position of said command part, and a control element positioned in accordance with the error in the relative positions of the slave member and command part for energizing said power means to reduce the error and position said slave member in accordance with said command part.

3. In a control system for a gill box having a driven element whose speed is varied to vary the draft of the sliver being operated upon by the gill box, a movable member positionable to determine the speed of said element, a rotating memory wheel comprising a plurality of pins arranged in a circular array, read-in and read-out stations adjacent said wheel for respectively setting and reading the setting of said pins, sensing means for sensing the thickness of said sliver, input means responsive to said sensing means for setting said pins as they move past the read-in station into a position indicating sliver thickness, and a power servo for sequentially sensing the position of the pins set by said input means as the pins are moved past the read-out station and for positioning said movable member in accordance with the setting of the pins, said power servo comprising a command part positioned by said pins, a slave member connected to position said movable member in accordance with the position of said slave member, power means connected to said slave member and positioning said slave member in accordance with the position of said command part, and a control element positioned in accordance with the error in the relative positions of the slave member and command part for energizing said power means to reduce the error and position said slave member in accordance with said command part.

4. In a control system for a gill box having a driven element whose speed is varied to vary the draft of the sliver being operated upon by the gill box, a movable member positionable to determine the speed of said element, a rotatable memory wheel comprising a plurality of pins arranged in a circular array, read-in and read-out stations adjacent said wheel, sensing means for sensing the thickness of said sliver, input means responsive to said sensing means for setting said pins in a position indicating sliver thickness as they move past the read-in station, and a power servo for sequentially sensing the position of the pins set by said input means as the pins are moved past the read-out station and for positioning said movable member in accordance therewith, said power servo having a movable input part set in accordance with the setting of said pins, a slave member connected to said movable member to actuate the latter, a reversible power actuator operable in opposite directions for positioning said slave member, a control element having a neutral position in which said actuator is inactive and displaceable in oposite directions therefrom to energize said actuator to operate in opposite directions, means connecting said input part to said control element to displace said element in opposite directions upon movement of said part in opposite directions, and feedback means connecting said actuator to said control element to actuate the latter in a direction toward neutral upon operation of said actuator in a direction corresponding to the displacement of said control element.

5. In a control system for a gill box as defined in claim 4 wherein said reversible power actuator is a double-acting fluid pressure cylinder and said control element is a valve member for controlling the connections of the actuator to a source of fluid pressure and to drain.

6. In a control system as defined in claim 4 wherein a mechanical linkage comprising a pivoted lever rockable about an axis interconnects said input part and said control element, said input part acting on said lever at a first point and wherein means connects a second point on said lever to actuate said control element, said second point being disposed closer to the axis of said lever than said first point.

7. In a control system as defined in claim 6 wherein said means connecting said lever to said control element includes biasing means acting in a direction to bias said lever about its axis to move said first point toward engagement with the pin at the read-out station for said memory wheel.

8. In a control system including a memory wheel comprised of a plurality of axially settable memory pins arranged in a circular array and a part engageable with the pins and set in accordance with the pins as they pass a read-out station, a rockable lever having a free end, said part engaging said pins and being connected to said free end of said lever to rock said lever upon displacement of the part by said pins, a support member pivotally mounting said lever for rocking movement about a first axis, an output member to be positioned in accordance with the positions of said pins as they pass said read-out station, a reversible power actuator energizable to position said output member, a movable control element for controlling the energization of said actuator having a neutral position in which said actuator is inactive and displaceable in opposite directions therefrom to effect operation of said actuator in opposite directions, biasing means acting on said control element, and means connecting said control element to said lever for movement therewith and at a point intermediate said axis and said free end, said biasing means urging said control element and said lever in a direction to urge said free end toward said part.

9. In a control system as defined in claim 8 and further comprising a mounting supporting said lever for pivotal movement and for translatory movement, and a feedback means responsive to movement of said output member to effect translatory movement of said lever to return said control element toward neutral when the actuator is operating in the direction corresponding to the displacement of the control element from neutral.

10. In a control system including a memory wheel comprised of a plurality of axially settable memory pins arranged in a circular array and a part engageable with the pins and set in accordance with the pins as they pass a read-out station, a rockable lever having a free end, said part engaging said pins and being connected to said free end of said lever to rock said lever upon displacement of the part by said pins, a support member pivotally mounting said lever for rocking movement about a first axis, an output member to be positioned in accordance with the positions of said pins as they pass said read-out station, a reversible power actuator energizable to position said output member, a movable control element for controlling the energization of said actuator and having a neutral position in which said actuator is de-energized and displaceable in opposite directions therefrom to effect operation of said actuator in opposite directions, biasing means acting on said control element, and means connecting said control element to said lever for movement therewith and at a point intermediate said axis and said free end, said biasing means urging said control element and said lever in a direction to urge said free end toward said part, a mounting supporting said support member for movement having components transversely of and along the length of said lever, a movable member disposed to engage said support member and prevent movement thereof by said biasing means, and means for moving said support member in accordance with and in a direction dependent upon the direction of movement of said output member to operate said lever to return said control element toward its neutral position when said actuator is operating in the direction corresponding to the direction of displacement of said control element from its neutral position.

11. In a control system as defined in claim 10 wherein said mounting comprises an arm extending transversely of said lever and having one end pivotally supporting said support member, the other end of said arm being supported for rocking movement about an axis perpendicular to the plane containing said arm and lever.

12. In a control system for a gill box having a driven element whose speed is varied to vary the draft of the sliver being operated upon by the gill box, a rotatable memory wheel comprising a plurality of pins arranged in a circular array, read-in and read-out stations adjacent said wheel, sensing means for sensing the thickness of said sliver, input means responsive to said sensing means entering said gill box for setting said pins in a position indicating sliver thickness as they move past the read-in station, reading means for reading the setting of said pins as they pass said read-out station, and means actuated by said reading means for driving said driven element at a speed corresponding to the setting of said pins, said input means comprising a lever, a pivotal connection mounting said lever for rocking movement about an axis, a member engaging said lever and movable to move said lever about its pivot, means for setting said member in a position corresponding to the thickness of said sliver, a part movable to vary the setting to which said pins are set as they pass said read-in station, said part engaging said lever at a point displaced from said member, means biasing said part into engagemnet with said lever to follow the latter, and means supporting said lever and pivotal connection for translation to move the rocking axis of said lever parallel to itself to vary the position of said part with said member in a fixed position.

13. In a control system, a rotatable memory wheel comprising a plurality of pins arranged in a circular array, read-in and read-out stations adjacent said wheel, input means at said read-in station for setting said pins, said input means comprising a lever, a pivotal connection mounting said lever for rocking movement about an axis, a member engaging said lever and movable to move said lever about its axis, a part engaging said lever at a point displaced from said member and movable to vary the setting to which said pins are set as they pass said read-in station, means biasing said part into engagement with said lever to follow the latter and means supporting said lever and pivotal connection for translation to move the axis of rocking movement of said lever parallel to itself to vary the position of said part with said member in a fixed position.

14. In a control system, the structure as defined in claim 13 wherein said means for supporting said lever and pivotal connection comprises a slide and screw means operatively connected to said slide and rotatable to vary the position thereof.

15. In a control system for positioning a controlled member, a reversible power actuator operatively connected to said controlled member and energizable to move the controlled member in opposite directions, a control element for controlling the energization of said actuator and having a neutral position in which said actuator is de-energized and displaceable in opposite directions from said neutral position to effect energization of said actuator to operate in opposite directions, means for controlling the position of said control element comprising a rockable lever, means operatively connecting said control element to said rockable lever for pivotal movement about a first axis and supporting the point of connection to move along a fixed line extending transversely of the lever whereby said control element is displaced on the rocking of said lever or translation thereof along said line, a movable support member supporting said rockable lever for rocking movement about a second axis parallel to said first axis, biasing means operating on said control element, rockable lever, and support member to urge said rockable lever in one direction about its second axis and to urge said movable support member generally in a direction in which said line extends, a part engaging said support member and limiting movement thereof due to said biasing means and movable to effect translation of said support member against the action of said biasing means, and means operatively connecting said part to said actuator to be operated thereby in a direction to move said support member and in turn said lever to return said control element toward its neutral position when said actuator operates in response to displacement of said control element from its neutral position, and means for displacing said lever about said second axis against the bias of said biasing means.

16. A control system as defined in claim 15 wherein said support member is supported to move in a direction lengthwise of said lever on rocking movement thereof and said part engages a cam surface on said support which operates to displace said lever laterally as it is moved lengthwise on the rocking thereof to amplify the lateral displacement at the point of connection of said control element in response to the rocking of said lever.

17. In a gill box having a driven element whose speed is varied to control the draft of the sliver being operated upon, a positive infinitely variable speed transmission having an output shaft and a movable control member adjustable to control the speed of said output shaft, means connecting said output shaft to drive said element, a reversible power actuator comprising a double-acting fluid pressure cylinder operatively connected to move said control member upon energization and operation of the actuator, and control means responsive to the thickness variations of sliver entering said gill box for energizing said actuator to variably position said control member in accordance with the thickness variations of said sliver, said control means comprising sensing means for sensing the thickness of said sliver, a control element for said actuator comprising a movable valve member for controlling the connections of the opposite ends of said actuator to drain and a source of fluid pressure supply and displaced in response to a sensing by said sensing means of a variation in thickness of said sliver and having a neutral position in which said actuator is inactive and effective when displaced therefrom to effect energization of said actuator to operate said actuator in a direction dependent upon the direction of displacement of said control element from said neutral position, and means responsive to the operation of said actuator for returning said control element towards its neutral position as the actuator operates in the direction corresponding to the displacement of the control element from its neutral position.

References Cited in the file of this patent
UNITED STATES PATENTS

| | | |
|---|---|---|
| 1,132,316 | Eves | Mar. 16, 1915 |
| 3,012,288 | Werner | Dec. 12, 1961 |
| 3,026,743 | Curtis | Mar. 27, 1962 |

FOREIGN PATENTS

| | | |
|---|---|---|
| 1,011,329 | Germany | June 27, 1957 |